(12) United States Patent
Harris

(10) Patent No.: US 6,808,187 B1
(45) Date of Patent: Oct. 26, 2004

(54) TANDEM SCOOTER

(76) Inventor: Timothy L. Harris, 4501 SW. 22$^{nd}$ St., Hollywood, FL (US) 33023

( * ) Notice: Subject to any disclaimer, the term of this patent is extended or adjusted under 35 U.S.C. 154(b) by 84 days.

(21) Appl. No.: 10/314,562

(22) Filed: Dec. 10, 2002

(51) Int. Cl.$^7$ ................................................ B62M 1/00
(52) U.S. Cl. .............................. 280/87.01; 280/87.021; 280/87.041
(58) Field of Search ........................ 280/87.01, 87.021, 280/87.041, 87.042, 87.05, 14.27, 14.21, 14.28, 62

(56) References Cited

U.S. PATENT DOCUMENTS

| | | | |
|---|---|---|---|
| 316,649 A | | 4/1885 | Pausey et al. |
| 442,174 A | | 12/1890 | Elliott |
| 1,100,322 A | * | 6/1914 | O'Day ....................... 105/162 |
| 1,267,050 A | | 5/1918 | Brigel |
| D149,012 S | | 3/1948 | Parker |
| 3,680,879 A | * | 8/1972 | Cogliano .................... 280/7.16 |
| 4,537,412 A | * | 8/1985 | Hill ............................ 280/7.12 |
| 5,282,639 A | | 2/1994 | Chen |
| 5,503,419 A | | 4/1996 | Gardner |
| 5,505,845 A | * | 4/1996 | Ford ........................... 210/117 |
| 6,213,561 B1 | * | 4/2001 | Witthaus ..................... 301/6.1 |
| 6,250,656 B1 | * | 6/2001 | Ibarra ..................... 280/87.041 |
| 6,279,929 B1 | * | 8/2001 | Fruechtenicht ......... 280/87.041 |
| 6,435,529 B1 | * | 8/2002 | Stewart et al. ......... 280/87.041 |
| 6,443,470 B1 | * | 9/2002 | Ulrich et al. .......... 280/87.041 |
| 6,715,779 B2 | * | 4/2004 | Eschenbach ................ 280/221 |

* cited by examiner

Primary Examiner—Christopher P. Ellis
Assistant Examiner—Christopher Bottorff

(57) ABSTRACT

A tandem scooter for allowing two people to ride comfortably on one scooter. The tandem scooter includes a wheel assembly including front, middle, and rear wheels members, and also including front, middle, and rear wheel axles upon which the front, middle, and rear wheel members are mounted; and also includes a deck assembly including a deck being mounted upon the wheel assembly and upon which users stand when using the tandem scooter; and further includes a handle assembly being attached to the wheel assembly and to the deck assembly; and also includes a deck support frame being attached to the deck and to the handle assembly; and further includes a brake assembly being attached to the handle assembly and being engagable to the front wheel member.

7 Claims, 4 Drawing Sheets

TANDEM SCOOTER

BACKGROUND OF THE INVENTION

1. Field of the Invention

The present invention relates to two-rider scooters and more particularly pertains to a new tandem scooter for allowing two people to ride comfortably on one scooter.

2. Description of the Prior Art

The use of two-rider scooters is known in the prior art. More specifically, two-rider scooters heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 1,267,050; 5,282,639; 5,503,419; 316,649; 442,174; and Des. 149,012.

While these devices fulfill their respective, particular objectives and requirements, the aforementioned patents do not disclose a new tandem scooter. The prior art includes descriptions of tandem bicycles and tricycles having two seats, two wheels, two sets of pedals, and two handlebars.

SUMMARY OF THE INVENTION

The general purpose of the present invention, which will be described subsequently in greater detail, is to provide a new tandem scooter which has many of the advantages of the two-rider scooters mentioned heretofore and many novel features that result in a new tandem scooter which is not anticipated, rendered obvious, suggested, or even implied by any of the prior art two-rider scooters, either alone or in any combination thereof. The present invention includes a wheel assembly including front, middle, and rear wheels members, and also including front, middle, and rear wheel axles upon which the front, middle, and rear wheel members are mounted; and also includes a deck assembly including a deck being mounted upon the wheel assembly and upon which users stand when using the tandem scooter; and further includes a handle assembly being attached to the wheel assembly and to the deck assembly; and also includes a deck support frame being attached to the deck and to the handle assembly; and further includes a brake assembly being attached to the handle assembly and being engagable to the front wheel member. None of the prior art includes the combination of the elements of the present invention.

There has thus been outlined, rather broadly, the more important features of the tandem scooter in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new tandem scooter which has many of the advantages of the two-rider scooters mentioned heretofore and many novel features that result in a new tandem scooter which is not anticipated, rendered obvious, suggested, or even implied by any of the prior art two-rider scooters, either alone or in any combination thereof.

Still another object of the present invention is to provide a new tandem scooter for allowing two people to ride comfortably on one scooter.

Still yet another object of the present invention is to provide a new tandem scooter that is easy to use and ride by two users together.

Even still another object of the present invention is to provide a new tandem scooter that allows one's partner to ride on his/her scooter at the same time for a fun-filled experience.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
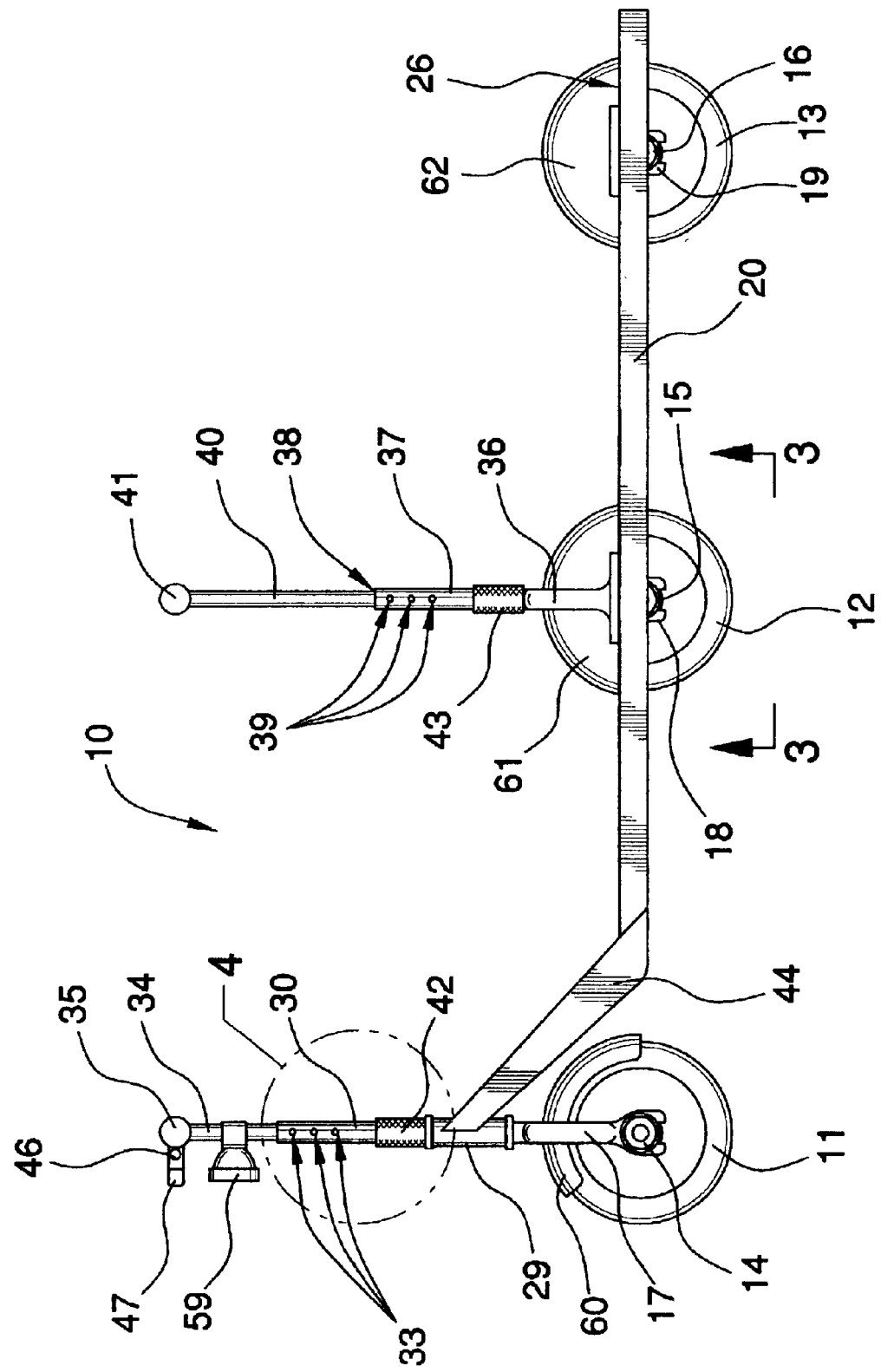
FIG. 1 is a side elevational view of a new tandem scooter according to the present invention.
Figure 2:
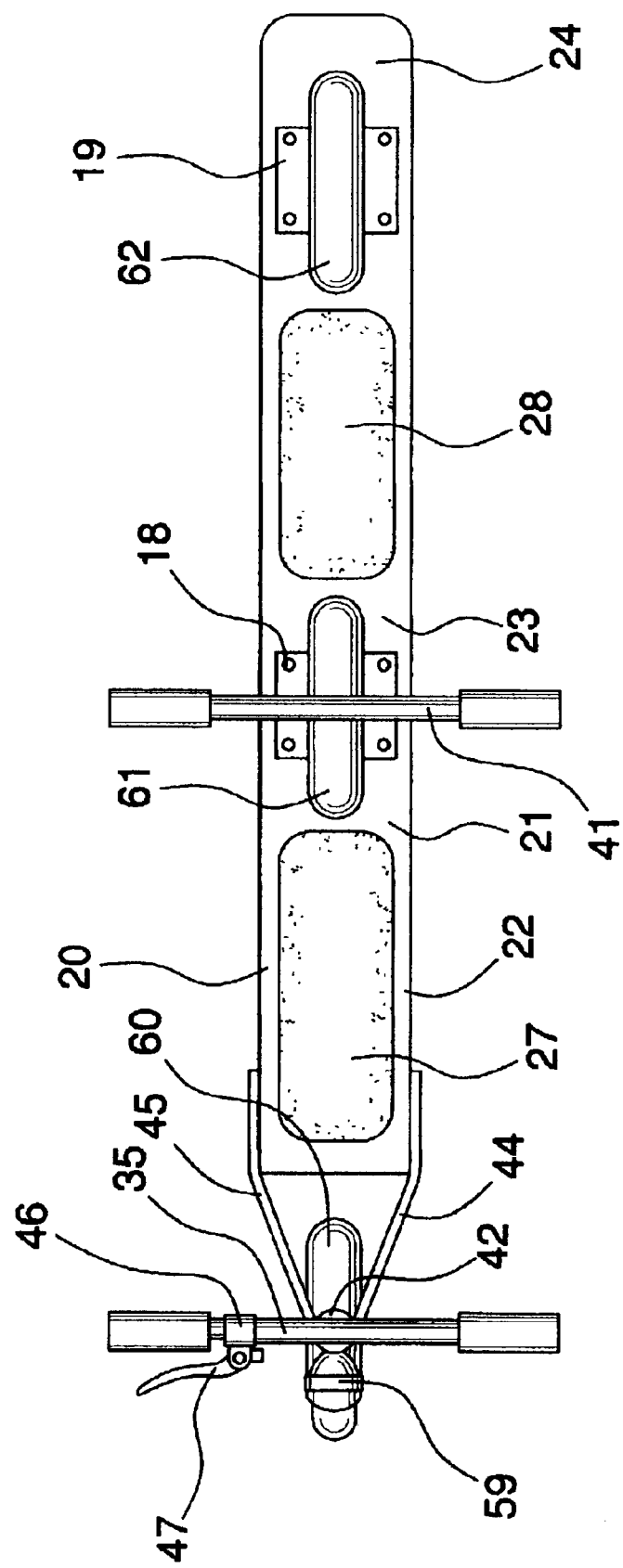
FIG. 2 is a top plan view of the present invention.
Figure 3:
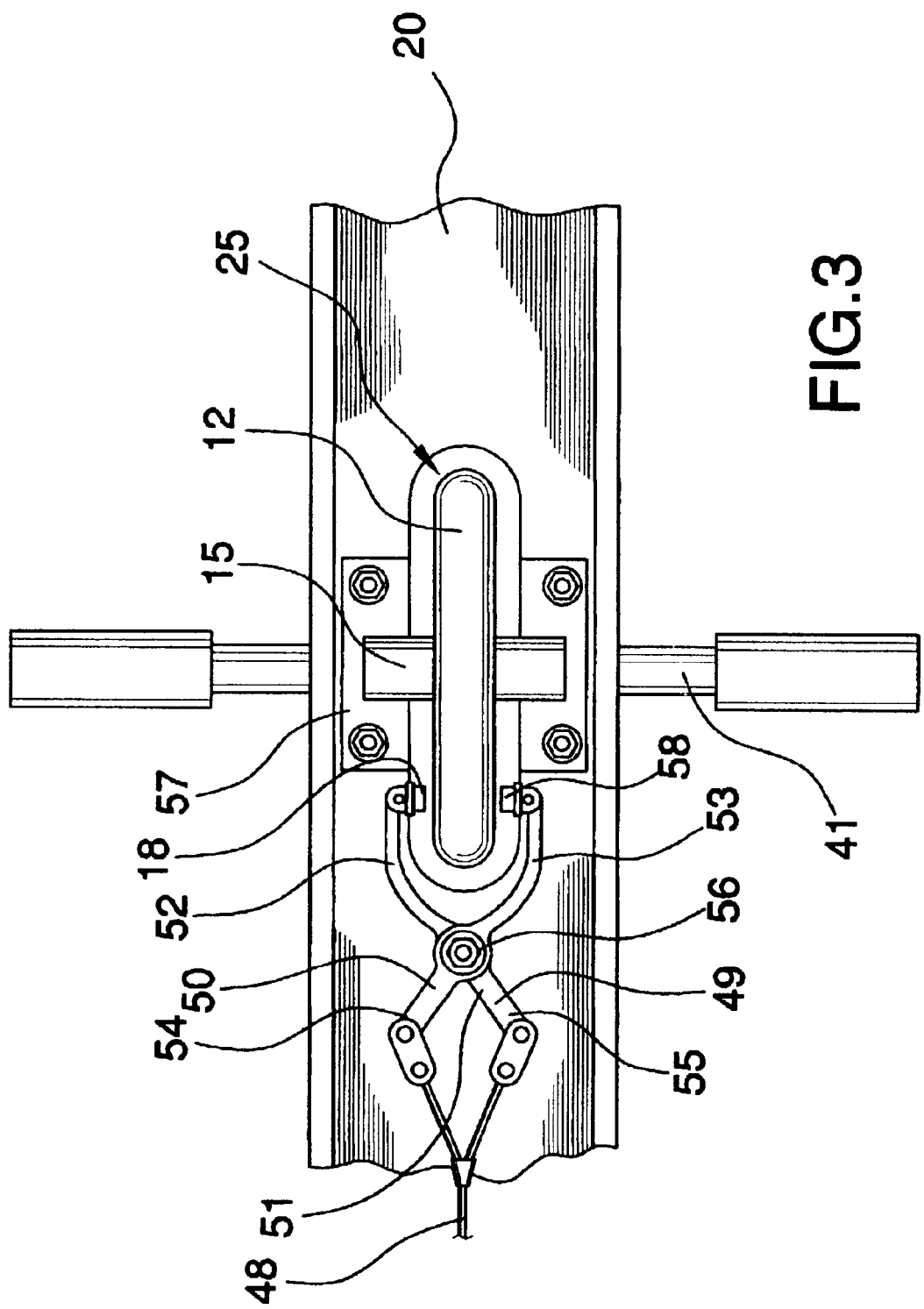
FIG. 3 is a detailed partial bottom plan view of the present invention.
Figure 4:
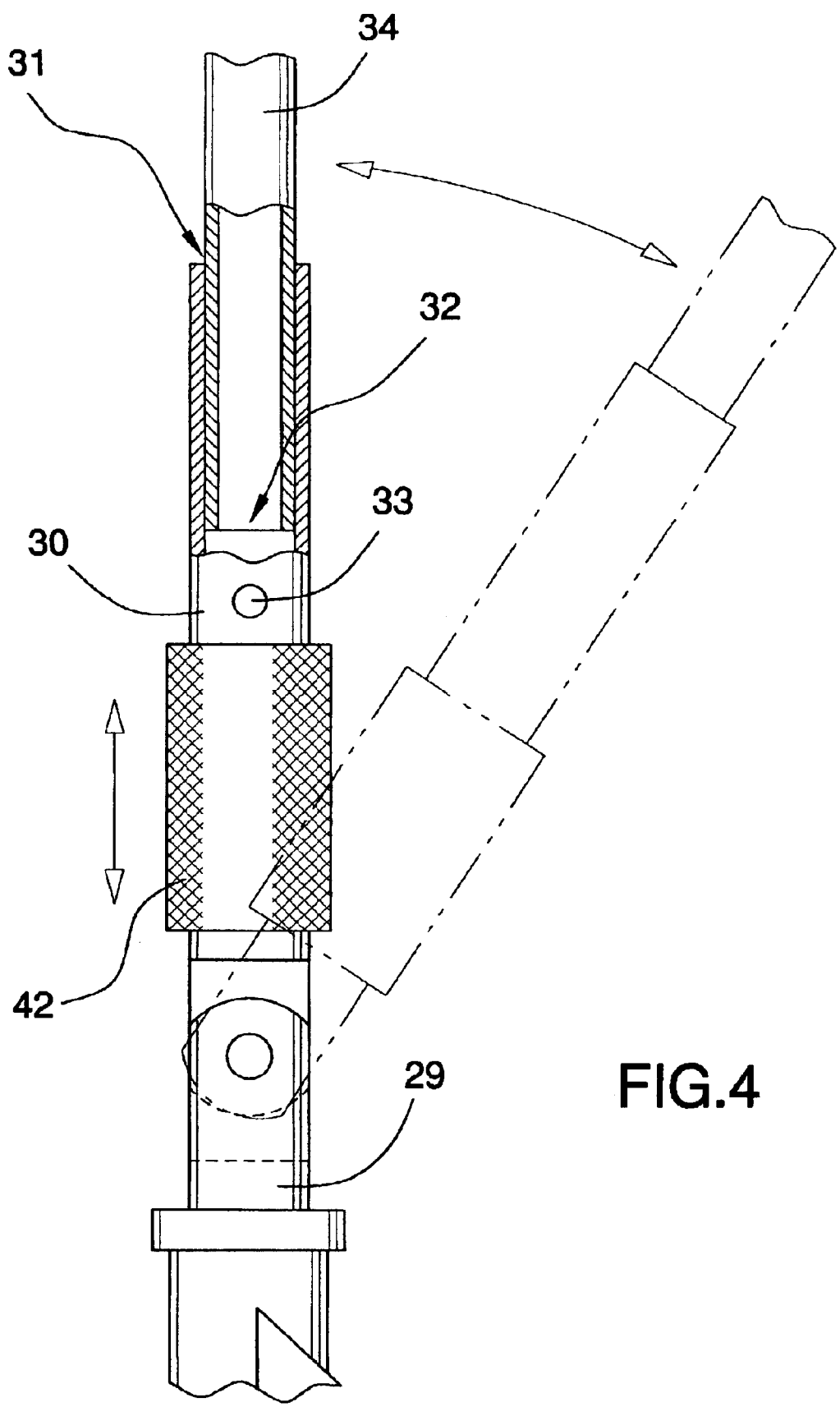
FIG. 4 is a detailed partial side elevational view of the front handle assembly of the present invention.

With reference now to the drawings, and in particular to FIGS. 1 through 4 thereof, a new tandem scooter embodying the principles and concepts of the present invention and generally designated by the reference numeral 10 will be described.

As best illustrated in FIGS. 1 through 4, the tandem scooter 10 generally comprises a wheel assembly including front, middle, and rear wheels members 11–13, and also including front, middle, and rear wheel axles 14–16 upon which the front, middle, and rear wheel members 11–13 are conventionally mounted. The wheel assembly further includes an inverted U-shaped bracket member 17 upon which the front wheel axle 14 is conventionally mounted and bolted; and further includes a middle wheel bracket member 18 to which the middle wheel axle 15 is conventionally mounted and bolted; and also includes a rear wheel bracket member 19 to which the rear wheel axle 16 is conventionally mounted and bolted; and further includes front, middle, and rear fender members 60–62 being securely and conventionally disposed about the front, middle, and rear wheel members 11–13 and being conventionally mounted to respective the U-shaped, middle wheel, and rear wheel bracket members 17–19.

A deck assembly includes a deck 20 being conventionally mounted upon the wheel assembly and upon which users stand when using the tandem scooter 10. The deck 20 includes front, middle, and rear portions 22–24, and also includes a top surface 21. The deck assembly further includes non-slip sheets of material 27,28 being securely and conventionally disposed upon the front and rear portions 22,24 and upon the top surface 21 of the deck 20. The deck assembly also includes a middle wheel opening 25 being disposed through the middle portion 23 of the deck 20, and further includes a rear wheel opening 26 being disposed through the rear portion 24 of the deck 20. The middle wheel and rear wheel bracket members 18,19 are securely and conventionally attached to the deck 20.

A handle assembly is attached to the wheel assembly and to the deck assembly. The handle assembly includes a first base member 29 being conventionally attached to the inverted U-shaped bracket member 17, and also includes a first elongate tubular member 30 being hingedly attached to the first base member 29 and having an open top end 31 and a bore 32 being disposed therein through the open top end 31 and also having holes 33 being disposed through a side wall thereof and into the bore 32, and also includes a first elongate handle support member 34 being telescopingly and fastenably received in the bore 32 of the first elongate tubular member 30 through the open top end 31, and further includes a first handlebar member 35 being conventionally attached to a top of the first elongate handle support member 34 and having handgrips being conventionally attached to end portions thereof, and also includes a first sleeve 42 being slidably disposed about the first elongate tubular member 30 and being removably disposed about the first base member 29 to generally lock the first elongate tubular member 30 perpendicularly to the deck 20, further includes a reflector member 59 being conventionally attached to the first elongate handle support member 34 for reflecting light so that the tandem scooter can be seen even in the dark. The handle assembly further includes a second base member 36 being conventionally attached to the middle portion 23 and upon the top side 21 of the deck 20, and also includes a second elongate tubular member 37 being hingedly attached to the second base member 36 and having an open top end 38 and also having holes 39 being disposed through a side wall thereof, and also includes a second elongate handle support member 40 being telescopingly and fastenably received in the second elongate tubular member 37 through the open top end 38, and further includes a second handlebar member 41 being conventionally attached to a top of the second elongate handle support member 40 and having handgrips being conventionally attached to end portions thereof, and also includes a second sleeve 43 being slidably disposed about the second elongate tubular member 37 and being removably disposed about the second base member 36 to generally lock the second elongate tubular member 37 perpendicularly to the deck 20.

A deck support frame 44,45 is conventionally attached and welded to the deck 20 and to the handle assembly. The deck support frame 44,45 includes a pair of elongate frame members being spaced apart and being conventionally attached to the front portion 22 of the deck 20 and being conventionally attached to the first base member 29 of the handle assembly.

A brake assembly is attached to the handle assembly and is engagable to the middle wheel member 12. The brake assembly includes a lever support bracket 46 being conventionally attached to the first handlebar member 35, and also includes a brake lever 47 being pivotally and conventionally attached to the lever support bracket 46, and further includes a cable 48 being conventionally connected to the brake lever 47, and also includes a scissors-shaped brake member 49 being conventionally attached to a bottom side of the deck 20 and being engagable to the middle wheel member 12 and being connected with connectors to the cable 48. The scissors-shaped brake member 49 includes a pair of linkage members 50,51 being pivotally attached to one another, and also includes pad members 57,58 being conventionally attached to the linkage members 50,51 and being engagable to the middle wheel member 12, and further includes a spring 56 being conventionally attached to the linkage members 50,51. The linkage members 50,51 have jaw portions 52,53 being opposedly disposed to one another and to which the pad members 57,58 are securely attached. The linkage members 50,51 also have handle portions 54,55 to which the cable 48 is attached for moving the jaw portions 52,53 into engagement to the middle wheel member 12. The spring 56 biases the jaw portions 52,53 away from one another and out of engagement with the middle wheel member 12.

In use, the users secure the first and second elongate tubular members 30,37 perpendicular to the deck 20 and grasp the first and second handlebar members 35,41 and stand upon the non-slip sheets of material 27,28 and use their feet to propel the tandem scooter 10 upon a ground surface by pushing off on the surface. The user grasping the first handlebar member 35 essentially steers the tandem scooter 10 and also brakes the tandem scooter 10 using the brake lever 47 which engages the pad members 57,58 to the middle wheel member 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the tandem scooter. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tandem scooter comprising:
    a wheel assembly including front, middle, and rear wheels members, and also including front, middle, and rear wheel axles upon which said front, middle, and rear wheel members are mounted, said wheel assembly further including an inverted U-shaped bracket member upon which said front wheel axle is mounted, and further including a middle wheel bracket member to which said middle wheel axle is mounted; and also including a rear wheel bracket member to which said rear wheel axle is mounted; and further including front, middle, and rear fender members being securely disposed about said front, middle, and rear wheel members and being mounted to respective said U-shaped, middle wheel, and rear wheel bracket members;

a deck assembly including a deck being mounted upon said wheel assembly and upon which users stand when using said tandem scooter, said deck including front, middle, and rear portions, and also including a top surface, said deck assembly further including non-slip sheets of material being securely disposed upon said front and rear portions and upon said top surface of said deck, said deck assembly also including a middle wheel opening being disposed through said middle portion of said deck, and further including a rear wheel opening being disposed through said rear portion of said deck, said middle wheel and rear wheel bracket members being securely attached to said deck;

a handle assembly being attached to said wheel assembly and to said deck assembly;

a deck support frame being attached to said deck and to said handle assembly; and a brake assembly being attached to said handle assembly and being engageable to said middle wheel member.

2. A tandem scooter as described in claim 1, wherein said handle assembly includes a first base member being attached to said inverted U-shaped bracket member, and also includes a first elongate tubular member being hingedly attached to said first base member and having an open top end and a bore being disposed therein through said open top end and also having holes being disposed through a side wall thereof and into said bore, and also includes a first elongate handle support member being telescopingly and fastenably received in said bore of said first elongate tubular member through said open top end, and further includes a first handlebar member being attached to a top of said first elongate handle support member and having handgrips attached about end portions thereof, and also includes a first sleeve being slidably disposed about said first elongate tubular member and being removably disposed about said first base member to generally lock said first elongate tubular member perpendicularly to said deck, and further includes a reflector member being attached to said first elongate handle support member for reflecting light so that said tandem scooter can be seen even in the dark.

3. A tandem scooter as described in claim 2, wherein said handle assembly further includes a second base member being attached to said middle portion and upon said top side of said deck, and also includes a second elongate tubular member being hingedly attached to said second base member and having an open top end and also having holes being disposed through a side wall thereof, and also includes a second elongate handle support member being telescopingly and fastenably received in said second elongate tubular member through said open top end, and further includes a second handlebar member being attached to a top of said second elongate handle support member and having handgrips being attached to end portions thereof, and also includes a second sleeve being slidably disposed about said second elongate tubular member and being removably disposed about said second base member to generally lock said second elongate tubular member perpendicularly to said deck.

4. A tandem scooter as described in claim 3, wherein said deck support frame includes a pair of elongate frame members being spaced apart and being attached to said front portion of said deck and being attached to said first base member of said handle assembly.

5. A tandem scooter as described in claim 4, wherein said brake assembly includes a lever support bracket being attached to said first handlebar member, and also includes a brake lever being pivotally attached to said lever support bracket, and further includes a cable being connected to said brake lever, and also includes a scissors-shaped brake member being attached to a bottom side of said deck and being engageable to said middle wheel member and being connected to said cable.

6. A tandem scooter as described in claim 5, wherein said scissors-shaped brake member includes a pair of linkage members being pivotally attached to one another, and also includes pad members being attached to said linkage members and being engageable to said middle wheel member, and further includes a spring being attached to said linkage members.

7. A tandem scooter as described in claim 6, wherein said linkage members have jaw portions being oppsedly disposed to one another and to which said pad members are securely attached, said linkage members also having handle portions to which said cable is attached for moving said jaw portions into engagement to said middle wheel member, said spring biasing said jaw portions away from one another and out of engagement with said middle wheel member.

* * * * *